INVENTOR.
John D. Caylor

Oct. 20, 1970    J. D. CAYLOR    3,535,495
CURVE-FOLLOWING APPARATUS

Filed Nov. 1, 1967    4 Sheets-Sheet 4

INVENTOR.
John D. Caylor
BY
ATTORNEY.

United States Patent Office 3,535,495
Patented Oct. 20, 1970

3,535,495
CURVE-FOLLOWING APPARATUS
John D. Caylor, Lenoir City, Tenn., assignor to the United States of America as represented by the United States Atomic Energy Commission
Filed Nov. 1, 1967, Ser. No. 679,782
Int. Cl. G06g 7/04
U.S. Cl. 235—61.6
8 Claims

ABSTRACT OF THE DISCLOSURE

An X–Y type recorder is modified for operation as a curve follower such that any one of a plurality of correction curves associated with the recorder can be selected for a curve-following operation thereof. The non-linear X-axis input to the recorder determines which correction curve is to be selected in the curve-following operation, and a linear output voltage is generated which is proportional to the non-linear X-axis input.

BACKGROUND OF THE INVENTION

The present invention relates to electrical read-out devices which, when fed with an input voltage proportional to a given value, generate an output voltage proportional to a selected non-linear function of said given value. More specifically, this invention relates to improvements in electrical systems which are designed to follow pre-constructed correction curves for the purpose of generating a voltage proportional to a non-linear function.

A typical prior art electric recorder of the X–Y type is one made by the Moseley Division of Hewlett Packard Company as their Model No. 2D–2A, which was designed for optional operation as a curve follower. When such a recorder is operated as a curve follower, the recorder pen is replaced with a special pickup coil; the recorder chart is replaced with an electrically non-conductive sheet or plate marked with an electrically conductive "correction curve." The X-axis servo system is adapted to move the pickup coil in the X-axis direction, this movement always being proportional to the magnitude of the input signal to the X-axis input terminals of the recorder. As will be described below, the curve follower is designed to keep the pickup centered over the centerline of the above-mentioned conductive curve and the X-axis input signals drive the pickup along the curve.

The above-mentioned correction curve, which is based on numerous actual measurements, is constructed so that the Y-axis position of any point on the curve is proportional to the magnitude of a non-linear function C of the X-axis input signal. The pickup is coupled mechanically to means for generating an output voltage proportional to the position of the pickup along the Y-axis. Thus, the curve-follower arrangement provides a direct (linear) read-out of C. Such a prior art Hewlett Packard system is illustrated in FIG. 1 of the drawings. In that system, the X-axis servo system of the recorder operates to maintain the pickup coil over the centerline of the correction curve. In other words, the Y-servo ensures that the pickup coil follows the curve as the coil moves in response to the X-axis input signal. This is accomplished by passing a high-frequency current through the electrically conductive correction curve. The pickup coil normally is positioned over the curve and is inductively coupled with the high-frequency electromagnetic field generated by the current passing through the curve. Lateral displacement of the pickup from the curve induces a voltage in the pickup coil; the phase of the induced voltage reverses if the pickup coil crosses the correction curve. The induced voltage, which is proportional to the displacement from the centerline of the curve, ultimately is fed into the Y-axis servo motor. The motor responds by positioning the pickup as required to center it over the curve.

A slidewire potentiometer is also coupled to the Y-axis servo motor to generate an output voltage proportional to the non-linear function C. This is accomplished by applying a preselected constant voltage across the potentiometer slidewire. When a given input is applied to the X-axis input, driving the pickup to a position on the correction curve, the movement of the pickup is accompanied by a corresponding adjustment of the potentiometer slidewire output voltage to a value proportional to C. This voltage can then be fed to a digital voltmeter or other device to provide a linear read-out of C.

The problem with such a prior art curve follower is that only one correction curve can be utilized at a time, and, where a plurality of unknown values, each having a different correction curve, are to be sequentially determined with such a prior device, much time is required in installing and removing correction curves. The use of a plurality of conductive correction curves, that is, a multiple-curve plate, in the prior device is not feasible because control of the pickup position along the Y-axis would be lost if the field sensitive pickup were moved more than a short distance away from a given curve. In other words, it is impossible to move the pickup from one conductive curve to another conductive curve along the Y-axis of the device. The above problem has been solved in the present invention in a manner to be described below.

SUMMARY OF THE INVENTION

With a knowledge of the limitations of the prior art, as discussed above, it is the object of the present invention to provide an improved curve-follower device in which a plurality of correction curves can be utilized and in which any one of the curves can be selected for following in the operation of the device. This object has been accomplished in the present invention by combining a different type of pickup and a new type of curve-and-plate assembly. The assembly includes a non-conductive base which is provided with a conductive metal facing. The metal facing is etched as required to form a plurality of correction curves which extend completely through the facing and which also extend from one margin of the plate to the opposite margin. Thus the curves divide the facing into electrically isolated regions. By means of a source of voltage and a stepping selector switch, two voltages 180° out of phase are connected such that one of these voltages is impressed on the regions of the facing lying on one side of any selected curve and to impress the other voltage on the regions on the other side of that curve.

The X-axis input system to the curve follower of the present device is the same as utilized in the above-mentioned prior device. In the Y-axis portion of the present device, a curve-following pickup of the capacitance (electrostatic) type is mounted on the recorder carriage in place of the usual pickup coil. The Y-axis servo system acts to maintain the pickup unit centered over the selected correction curve and to drive an output slidewire potentiometer in a manner to be described below. After a curve-following operation with the selected curve, the stepping switch is then actuated to select another correction curve corresponding to a different X-axis input signal for a subsequent operation. This procedure is repeated again and again until all of the correction curves have been utilized. Thus it can be seen that the present invention provides a device in which a plurality of linear voltages respectively proportional to a corresponding plurality of non-linear functions can be determined sequentially in a rapid manner which was not possible with the above-mentioned prior art device.

DESCRIPTION OF THE PREFERRED EMBODIMENT

Figure 1:
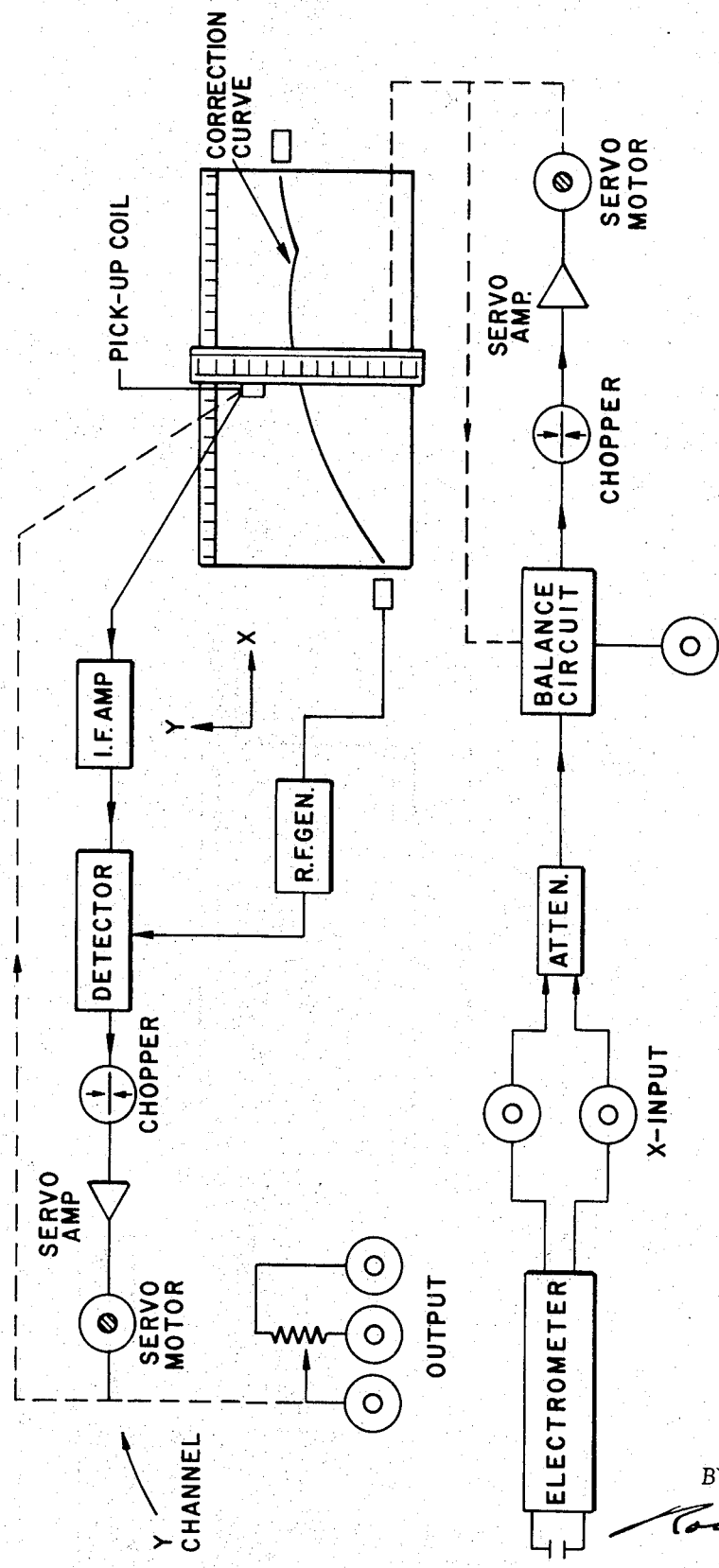
FIG. 1 is a schematic diagram of a prior art (Hewlett Packard) commercial X-Y recorder as arranged for operation as a curve follower.
Figure 2:
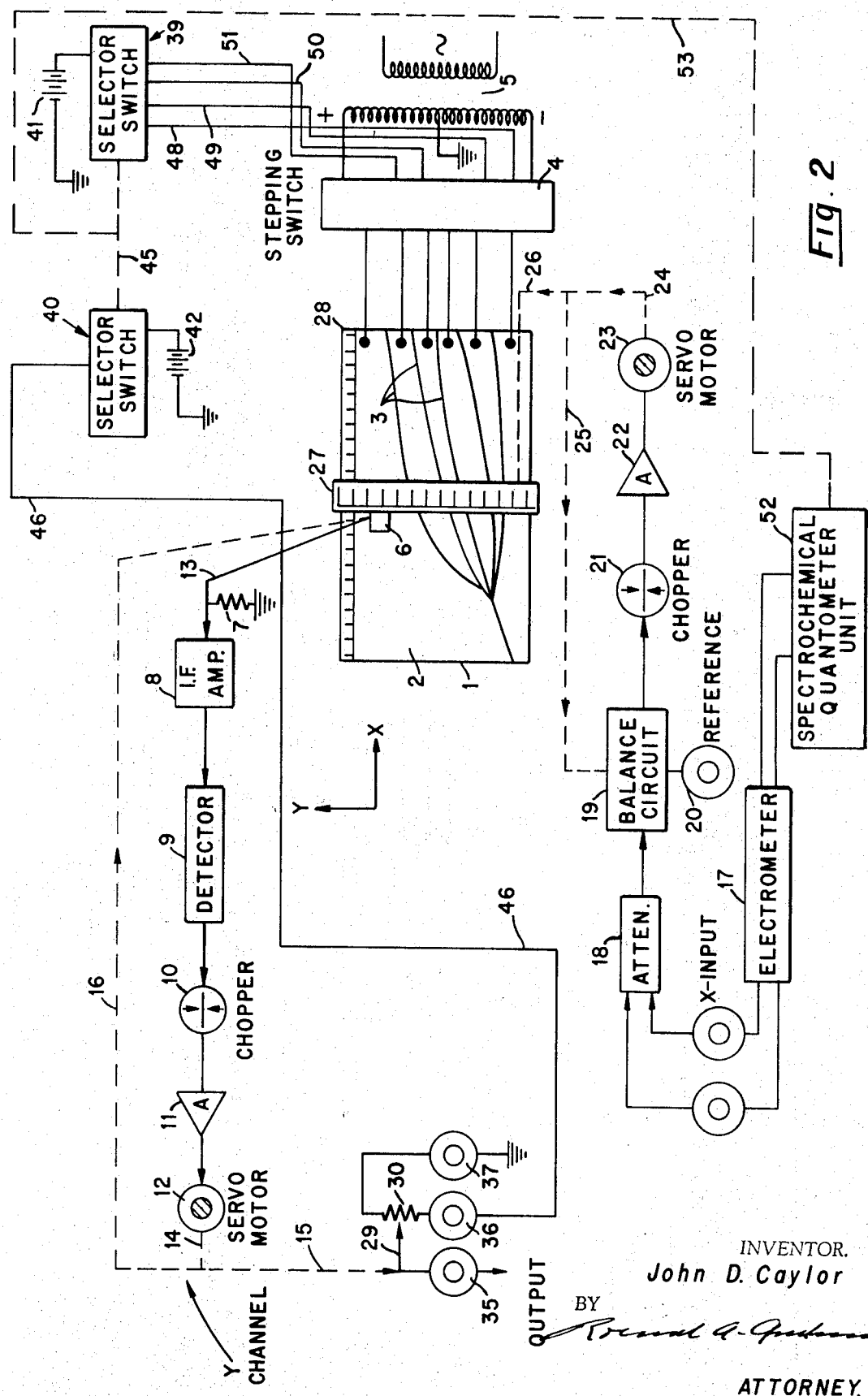
FIG. 2 is a schematic diagram of the X-Y recorder of FIG. 1 modified in such a manner as to accomplish the above object.

FIG. 2 of the drawings illustrates the curve follower of the present invention, which is an improvement over the prior art Hewlett Packard curve follower of FIG. 1. In FIG. 2, the carriage 27 of the X-Y unit is driven along the X-axis by means of the X-axis servo system in the same manner as in the prior art system. This is accomplished by connecting an X-axis input signal from an electrometer 17 to an attenuator 18. After passing through the attenuator 18, the input signal is applied to a balance circuit 19 where it is opposed by a reference voltage 20 of opposite polarity. If this voltage is equal to the signal voltage, there is no difference voltage from the balance circuit and the servo system is at rest (or null). When the input signal changes to a new value, it is no longer cancelled in the balance circuit and the unbalance voltage, or error signal, is applied to a chopper 21, where it is converted to alternating current at line frequency. The AC output of the chopper 21 is amplified by an amplifier 22 and applied to the control winding of a two-phase servo motor 23. The motor 23 is mechanically coupled to the carriage 27 by means of couplings 24 and 26, and is mechanically coupled to the balance circuit 19 potentiometer by means of couplings 24 and 25 which changes the balance voltage until it again cancels the new value of input signal. If the input data is changing constantly at rates within the capabilities of the instrument, this rebalancing action is continuous. Thus, the positions of the balance circuit potentiometer and of the carriage 27 are always directly proportional to the amplitudes of the signals at the X-axis input terminals.

The input to the electrometer 17 may be from a spectrochemical "Quantometer" unit such as disclosed in the patent application, Ser. No. 323,184, filed Nov. 12, 1963, by John W. Theiring, for example, which application is now Pat. No. 3,353,444, issued Nov. 21, 1967, or such as disclosed in the patent to Hasler et al., Pat. No. 2,675,734, issued Apr. 20, 1954.

The new curve-and-plate assembly of FIG. 2 is fabricated by standard printed circuit techniques. The plate 1, as more clearly seen in FIG. 5, comprises a rigid, non-conductive base which is provided with a conductive metal facing 2 provided with a scale 28 at the top thereof. The metal facing 2, which may be a thin sheet of copper, for example, is etched as required to form a plurality of correction curves 3, as shown in FIG. 2, which extend completely through the facing and which also extend from one margin of the plate to the opopsite margin. Thus, the curves divide the facing 2 into electrically isolated regions, as can more clearly be seen in FIG. 4 of the drawings.

Figure 4:
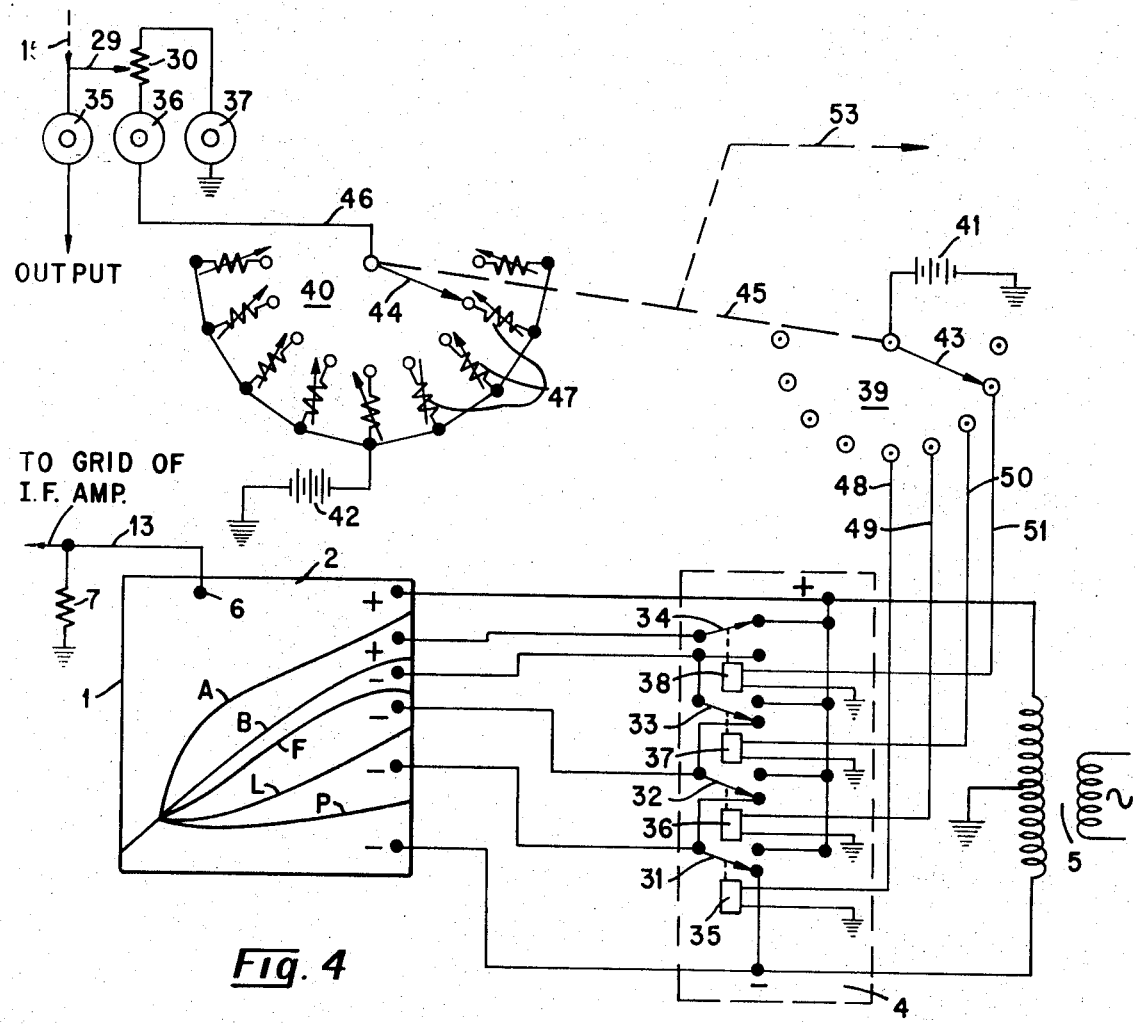
FIG. 4 is a wiring diagram showing the details of the selector stepping switch of FIG. 2.

As shown in FIG. 4, after the plate 1 has been mounted to the X-Y recorder type unit, the various regions of the facing 2 are connected to a relay operated stepping switch unit 4. The switch unit 4 is connected to the output of a center-tapped transformer 5 which provides two voltages 180° out of phase. The switch unit 4 is adapted to impress one of these voltages on the regions of the facing 2 lying on one side of any selected curve, curve B in FIG. 4, for example, and to impress the other voltage on the regions on the other side of that curve. A curve-following pickup 6 of the capacitance (electrostatic) type is mounted on the carriage 27 in place of the usual pickup coil. The pickup 6 conveniently is in the form of a metal button which is positioned close to and parallel with the facing 2. The button 6 is connected to ground through a lead 13 and a resistor 7, as shown.

Figure 3:
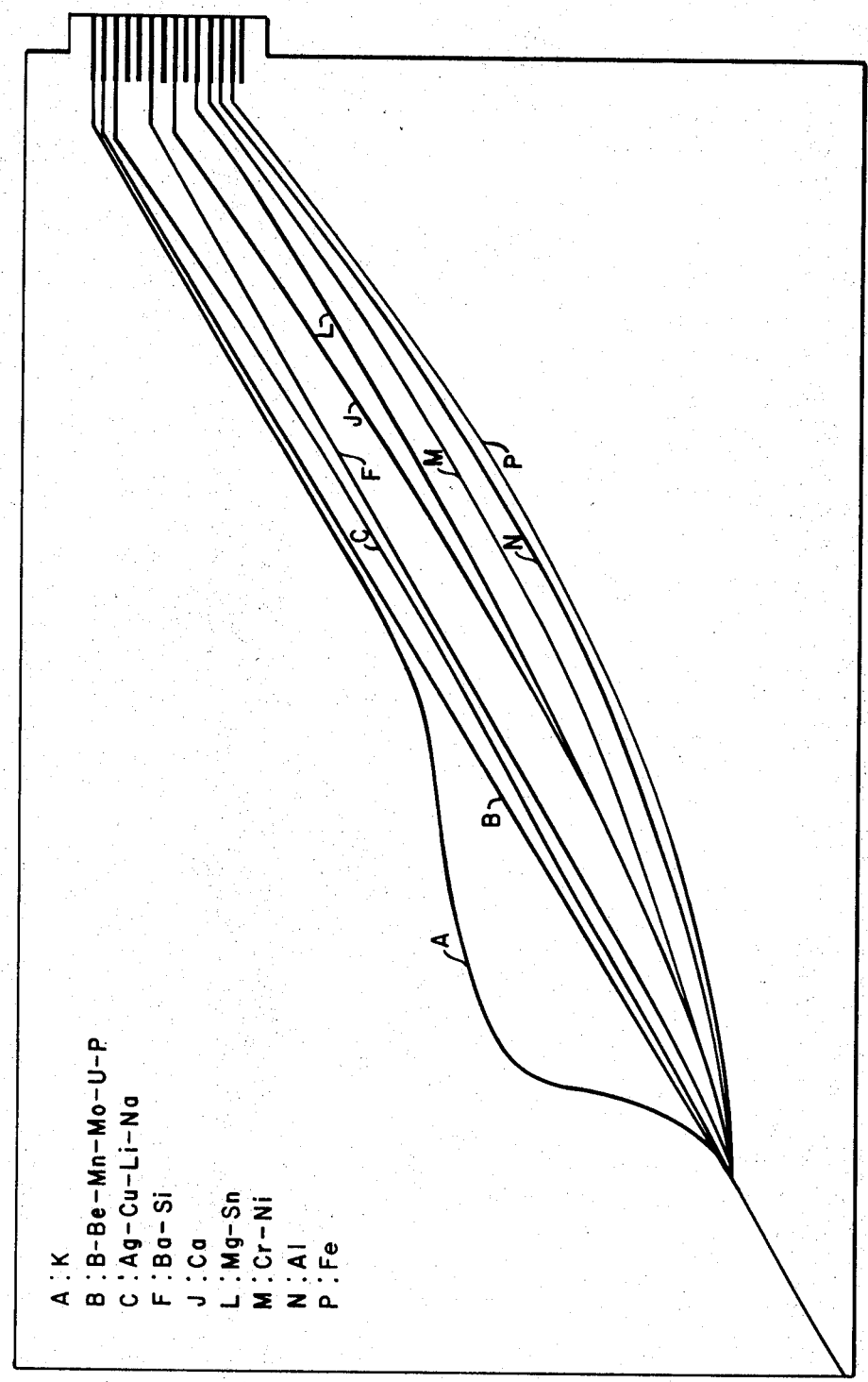
FIG. 3 is a showing of a typical curve-and-plate unit for use with the system of FIG. 2.

The switch unit 4 of FIG. 4 includes a plurality of relays 35, 36, 37, and 38 having respective switching arms 31, 32, 33, and 34 associated therewith, and these relays are connected to ground and are selectively energized means of respective leads 48, 49, 50 and 51, and a selector switch 39 having a switching arm 43 which is connected to a grounded battery 41, such that the above-mentioned two voltages, 180° out of phase, may be impressed on opposite sides of any one of the correction curves depending on which relay is energized by the switch 39. It should be understood and can be seen, that when more of the relays are energized an the relay switching arm 34 is in its other position, then correction curve A would have the out-of-phase voltages impressed on opposite sides thereof. It should also be understood that only four relays are shown in FIG. 4 for the sake of clarity and that the switching unit 4 can readily be expanded to add additional switching stages as needed or required depending upon the number of correction curves required for the analysis of a given sample. For example, a typical set of correction curves for a uranium sample is shown in FIG. 3. Thus, the switching unit 4 of FIG. 4 would require eight relays, one less than the number of correction curves. Also, the relays of FIG. 4 are not necessarily energized in the sequence shown, but may be energized in any desired sequence.

Figure 5:
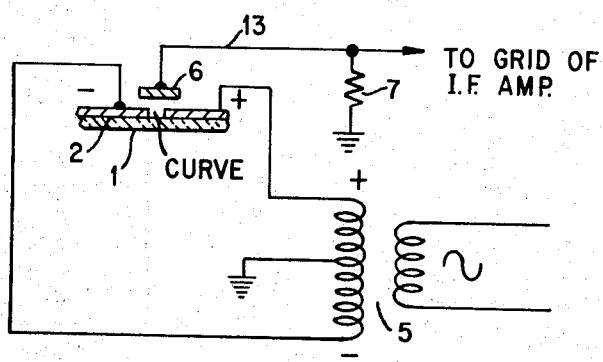
FIG. 5 is a schematic showing of the capacitance pickup unit of FIGS. 2 and 4.

Any voltage developed across the resistor 7 is impressed on the grid of a vacuum tube in the I.F. amplifier unit 8 of FIG. 2, and the output of the unit 8 is connected to a phase sensitive detector 9. As shown in FIG. 5, the transformer-pickup-facing assembly comprises a reactance bridge which is at balance only when the pickup 6 is exactly centered over a curve flanked by regions of opposite polarity. When the bridge is balanced, no voltage is developed across the resistor 7 and the servo motor 12, connected to the phase sensitive detector 9 by means of a chopper 10 and an amplifier 11, is at rest. Any unbalance voltage across resistor 7 as a result of any displacement from a selected correction curve will ultimately energize the two-phase servo motor 12 such that the motor will drive and reposition the pickup 6 by means of the mechanical couplings 14 and 16 until it is centered over the selected correction curve. The motor 12 will drive the pickup 6 along the Y-axis in one direction or the other depending upon which side of the selected curve the pickup 6 is displaced therefrom.

The servo motor 12 also drives the arm 29 of an output potentiometer slidewire 30 by means of mechanical couplings 14 and 15. The output voltage of the slidewire from terminals 35 and 36 may be fed to a digital voltmeter or other device to provide a linear read-out of the non-linear input to the X-axis. In order for the slidewire output voltage to be within the range of the voltmeter it is necessary to connect a different, preselected voltage across the output slidewire for each of the correction curves, the selected voltage depending upon which correction curve has been selected for a curve-following operation. This is accomplished by a selector switch 40 mechanically ganged to the curve selection selector switch 39 by means of a mechanical coupling 45. The switching arm 44 of switch 40 is adapted to connect a selected one of the variable resistors 47 to the output slidewire 30 by means of a lead 46 and terminal 36. The other end of the slidewire 30 is connected to ground through the terminal 37. A grounded battery 42 is connected to each of the variable resistors 47. The voltage drop selectively available across each resistor 47 is preadjusted to a different value to provide the proper voltage drop across the slidewire 30 when a selected one of these resistors, associated with a corresponding selected correction curve, is switched into circuit with the slidewire. The reason that it is necessary to connect a different voltage across the output slidewire 30 for each selected correction curve is that it is known from experience that the concentration of a certain element in a given sample will be in the range of 0–20 p.p.m., the concentration of another element will be in the range of, say, 1000–2000 p.p.m., and the concentrations of still other elements will have other different known ranges. Thus, as pointed out above, by connecting the proper voltage across the output slidewire 30 for each selected correction curve, the output voltage across terminals 35 and 36 for each element will be within the range of the voltmeter, not shown.

The spectrochemical unit 52 of FIG. 2, such as disclosed in the above-mentioned application of John W. Theiring, is utilized in that application to determine the concentrations of a number of impurity elements in a sample material and includes an arc stand, a spectrometer unit, a plurality of integrator units, selector stepping switches for sequentially connecting the voltages stored in the integrator units to an electrometer amplifier, and a chart recorder connected to the amplifier output. At the end of an exposure period, the voltages stored in the respective capacitors of respective integrator units are proportional to the intensity-time integrals for the respective spectral lines. The intensities of the respective spectral lines are non-linear functions of the concentrations of the respective emitting elements in the sample under analysis. In order to provide respective linear read-outs of these various non-linear values, such a unit 52 is utilized in the present invention in a manner which will now be described.

Instead of sequentially connecting the integrator units to a chart recorder, as in the above application, the integrator units are sequentially connected as sequential X-axis inputs to the electrometer 17 in FIG. 2 of the present system. The stepping switch in the unit 52 for sequentially connecting the integrator units thereof to the unit 17 is mechanically connected by means of a coupling 53 to the coupling 45 for actuating the stepping switches 39 and 40 in step therewith such that the proper correction curve is selected and the proper voltage is connected across the output slidewire 30 corresponding to the associated integrator unit to thus provide, sequentially, linear output voltages at the output terminals 35 and 36 representing the concentrations of the impurity elements in the sample material.

Utilizing the present invention, as described above, accurate read-outs of impurity concentrations can be obtained rapidly and automatically. Extended use of this invention has demonstrated that the read-outs are reproducible to about 0.1%. Operation of the pickup is very rapid, less than a second being required for it to move from any one curve to another curve and to generate the read-out. Neglecting sample-loading time, as many as forty samples of uranium have been analyzed for about twenty elements each in a period of two hours. Thus, it can be seen that a great saving in time and expense is achieved in utliizing the present invention as compared with the prior art system of FIG. 1 as pointed out above.

It should be noted that, where the correction curves may intersect, forming facing regions bounded entirely by curves, such regions can be connected to the switching unit 4 by means of a pin or wire passed through the curve-supporting plate. It should also be noted that the facing 2 of the curve-and-plate assembly is not limited to the use of a thin copper sheet. For example, the facing 2 may consist of a thin aluminum sheet or foil, and the correction curves may be formed by hand marking the foil with a hot stylus pen.

For convenience, the present invention has been described and illustrated in terms of a spectrochemical application. It should be apparent that it is equally applicable for other uses which require automtaic generation of a plurality of linear voltages respectively proportional to a plurality of non-linear functions.

I claim:
1. A curve-follower system comprising a non-conductive rectangular base having a conductive surface, non-conductive correction curves of predetermined shape formed in the conductive material of the surface to divide it into isolated conductive regions on either side of each of the curves, means for applying A.C. potentials, 180° out of phase, to all respective opposite regions on either side of a selected one of said curves, a vertical carriage positioned above said surface, an electrostatic pickup mounted on said carriage, means for moving said carriage along the horizontal axis of said base and surface in response to a voltage representing a non-linear function of an unknown valve, said pickup providing a position error signal for all positions of said pickup which deviate from the center of said selected correction curve, means coupled to the output of said pickup and in response to any error signal received therefrom for driving said pickup along said vertical carriage until said pickup is centered over said selected curve, and means coupled to said last-named means for providing a linear output voltage indicative of the true magnitude of said unknown value when said pickup is centered over said selected curve.

2. The system set forth in claim 1, wherein said means for providing a linear output voltage includes a potentiometer slidewire, and means for connecting a predetermined selected voltage across said slidewire, said slidewire being provided with a movable contact arm which is mechanically coupled to said means for driving said pickup toward said curve centerline.

3. The system set forth in claim 2, wherein said means for applying said out-of-phase A.C. potentials to opposite regions on either side of a selected curve includes a plurality of relays, having single-pole, double-throw contacts associated therewith, circuit means connecting said relay contacts to said out-of-phase A.C. potentials and to said isolated conductive regions in such a manner as to provide said regions on opposite sides of said selected curve with opposite polarities, and means for selectively energizing each of said relays in a predetermined sequence, said circuit means effecting a shifting of the regions of opposite polarities of said surface to respective sides of different ones of said curves depending upon which relay is energized at any given time.

4. The system set forth in claim 3, wherein said means for moving said vertical carriage horizontally includes an electrometer connected to said voltage representing a non-linear function of an unknown value, an attenuator connected to the output of said electrometer, a balance circuit provided with a reference voltage and a balancing potentiometer and being connected to the output of said attenuator, a chopper connected to receive any error voltage from said balance circuit, an amplifier connected to the output of said chopper, a two-phase servo motor connected to the output of said amplifier, and means for mechanically coupling said servo motor to said balancing potentiometer of said balance circuit and to said vertical carriage for the horizontal positioning thereof.

5. The system set forth in claim 4, wherein a plurality of voltages representing non-linear functions of respective unknown values are adapted to be sequentially connected as sequential inputs to said electrometer by means of a stepping switch, and means for mechanically coupling said stepping switch to said means for selectively and sequentially energizing each of said relays such that as each of said plurality of voltages is switched to the input to said electrometer a different correction curve is selected for having the regions of opposite polarity connected thereacross.

6. The system set forth in claim 5, wherein said means for positioning said pickup along said vertical carriage and for positioning said contact arm of said output potentiometer slidewire includes a grounded resistor connected to said pickup to provide a phase-sensitive error voltage in response to any deviation in position of said pickup from the centerline of a selected one of said correction curves, an I.F. amplifier connected to said resistor, a series-connected phase-sensitive detector, chopper, second amplifier, and a second two-phase servo motor connected to the output of said I.F. amplifier, and means for mechanically coupling said servo motor to said output potentiometer contact arm and to said pickup for the respective positioning thereof.

7. The system set forth in claim 6, wherein said means for connecting a predetermined selected voltage across said slidewire includes a plurality of variable resistors connected to a grounded battery, means mechanically coupled to said selective relay energizing means and to said voltage selection stepping switch for sequentially connecting selected ones of said variable resistors to one side of said slidewire, and means for connecting the other side of said slidewire to ground, whereby the output of said potentiometer slidewire sequentially provides a plurality of respective output voltages indicative of the true magnitudes of said respective unknown values.

8. The system set forth in claim 7, wherein said plurality of voltages are obtained from a spectrochemical quantometer unit.

References Cited

UNITED STATES PATENTS

| | | |
|---|---|---|
| 2,597,866 | 5/1952 | Gridley. |
| 2,963,684 | 12/1960 | Moseley _____ 235—197 |
| 3,329,804 | 7/1967 | Anderson et al. |

THOMAS A. ROBINSON, Primary Examiner

U.S. Cl. X.R.

235—197